US011113245B2

(12) United States Patent
Constantinescu et al.

(10) Patent No.: US 11,113,245 B2
(45) Date of Patent: *Sep. 7, 2021

(54) POLICY-BASED, MULTI-SCHEME DATA REDUCTION FOR COMPUTER MEMORY

(71) Applicant: INTERNATIONAL BUSINESS MACHINES CORPORATION, Armonk, NY (US)

(72) Inventors: M. Corneliu Constantinescu, San Jose, CA (US); Marc A. Kaplan, Lake Worth, FL (US); Leo Luan, Saratoga, CA (US); Sven Oehme, Morgan Hill, CA (US); Wayne A. Sawdon, San Jose, CA (US); Frank B. Schmuck, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 385 days.

This patent is subject to a terminal disclaimer.

(21) Appl. No.: 16/047,322

(22) Filed: Jul. 27, 2018

(65) Prior Publication Data
US 2018/0336219 A1    Nov. 22, 2018

Related U.S. Application Data

(63) Continuation of application No. 14/627,385, filed on Feb. 20, 2015, now Pat. No. 10,089,319.

(51) Int. Cl.
*G06F 16/17* (2019.01)
*G06F 16/174* (2019.01)

(52) U.S. Cl.
CPC .................. *G06F 16/1748* (2019.01)

(58) Field of Classification Search
CPC ..................... G06F 3/1218; G06F 16/1748
(Continued)

(56) References Cited

U.S. PATENT DOCUMENTS

| 4,712,140 A | 12/1987 | Mintzer et al. |
| 5,574,906 A | 11/1996 | Morris |

(Continued)

OTHER PUBLICATIONS

List of IBM Patents or Patent Applications Treated as Related; (Appendix P) Filed Jul. 27, 2018; pp. 1-2.

(Continued)

*Primary Examiner* — Hanh B Thai
(74) *Attorney, Agent, or Firm* — Cantor Colburn LLP; Randall Bluestone (57) ABSTRACT

Embodiments relate to policy-based, multi-scheme data reduction for a computer memory. An aspect includes receiving a plurality of policy rules by a policy engine of the computer memory, wherein a first policy rule specifies applying a first data reduction scheme to data in the computer memory based on the data matching first characteristics, wherein a second policy rule specifies applying a second data reduction scheme to data in the computer memory based on the data matching second characteristics, wherein the first data reduction scheme is different from the second data reduction scheme. Another aspect includes determining, by the policy engine, that first data in the computer memory matches the first characteristics, and that second data in the computer memory matches the second characteristics. Yet another aspect includes applying the first data reduction scheme to the first data, and applying the second data reduction scheme to the second data.

20 Claims, 7 Drawing Sheets

300

```
┌─────────────────────────────────────────────────────────────┐
│   SPECIFY POLICY RULES FOR DATA REDUCTION IN POLICY ENGINE  │
│                            301                               │
└─────────────────────────────────────────────────────────────┘
                              │
                              ▼
┌─────────────────────────────────────────────────────────────┐
│ POLICY ENGINE DETERMINES STORAGE BLOCKS TO BE REDUCED, TYPE OF│
│   DATA REDUCTION TO USE, AND WHEN TO APPLY DATA REDUCTION   │
│                    BASED ON POLICY RULES                     │
│                            302                               │
└─────────────────────────────────────────────────────────────┘
                              │
                              ▼
┌─────────────────────────────────────────────────────────────┐
│   APPLY DATA REDUCTION BASED ON DETERMINATION BY POLICY ENGINE;│
│ UPDATE BLOCK GROUP HEADERS AND STORAGE BLOCK LOCATION RECORDS TO│
│                    REFLECT DATA REDUCTION                    │
│                            303                               │
└─────────────────────────────────────────────────────────────┘
```

(58) Field of Classification Search
USPC .................................................. 707/693, 694
See application file for complete search history.

(56) References Cited

U.S. PATENT DOCUMENTS

| | | | |
|---|---|---|---|
| 6,208,968 | B1 | 3/2001 | Vitale et al. |
| 6,347,298 | B2 | 2/2002 | Vitale et al. |
| 7,567,188 | B1 | 7/2009 | Anglin et al. |
| 7,739,312 | B2 | 6/2010 | Gordon et al. |
| 8,515,179 | B1 | 8/2013 | Robinson et al. |
| 8,650,163 | B1 | 2/2014 | Harnik et al. |
| 8,655,091 | B2 | 2/2014 | Robinson et al. |
| 8,675,648 | B1 | 3/2014 | Goel et al. |
| 8,842,937 | B2 | 9/2014 | Robinson et al. |
| 8,847,797 | B1 | 9/2014 | Barr |
| 9,123,091 | B2 | 9/2015 | Robinson et al. |
| 9,779,177 | B1* | 10/2017 | Reiner .................. G06F 16/119 |
| 10,019,457 | B1* | 7/2018 | Stefani ................ G06F 16/1744 |
| 2001/0012999 | A1 | 8/2001 | Vitale et al. |
| 2002/0138559 | A1 | 9/2002 | Ulrich et al. |
| 2004/0032882 | A1* | 2/2004 | Kane ........................ H04L 67/04 370/477 |
| 2006/0115171 | A1* | 6/2006 | Geiger .................. G06F 17/147 382/250 |
| 2007/0109153 | A1 | 5/2007 | Ma et al. |
| 2010/0228800 | A1* | 9/2010 | Aston .................. G06F 3/0689 707/822 |
| 2011/0040795 | A1 | 2/2011 | Gordon et al. |
| 2012/0191642 | A1 | 7/2012 | George et al. |
| 2013/0129256 | A1 | 5/2013 | Robinson et al. |
| 2013/0223752 | A1 | 8/2013 | Robinson et al. |
| 2013/0263289 | A1 | 10/2013 | Vijayan et al. |
| 2014/0037209 | A1 | 2/2014 | Robinson |
| 2014/0105485 | A1 | 4/2014 | Robinson et al. |
| 2014/0281212 | A1 | 9/2014 | Schreier et al. |
| 2016/0004631 | A1* | 1/2016 | Hayes ..................... G06F 16/00 711/103 |
| 2016/0246799 | A1 | 8/2016 | Constantinescu et al. |

OTHER PUBLICATIONS

IP.Com "Dynamic Allocation and Reclamation of Variable-Size Storage Elements in SITBOL," IP.com No. IPCOM000150740D; Jun. 21, 1975, 23 pages.

IP.Com; "Method, Systems and Architecture for Horizontal Machine Data Reduction on a Medical Device," IP.com No. IPCOM000149790D, Apr. 6, 2007; 15 pages.

IP.Com; "Reliable, Scalable, and High-Performance Distributed Storage: Data Dishibtion," IP.com No. IPCOM000234958D, Feb. 19, 2014, 9 pages.

IP.com; "Stable File System," IP.com No. IPCOM000204595D, Mar. 5, 2011; 9 pages.

* cited by examiner

POLICY-BASED, MULTI-SCHEME DATA REDUCTION FOR COMPUTER MEMORY

DOMESTIC PRIORITY

This application is a continuation of U.S. Non-Provisional application Ser. No. 14/627,385, entitled "POLICY-BASED, MULTI-SCHEME DATA REDUCTION FOR COMPUTER MEMORY", filed Feb. 20, 2015, the content of which is incorporated herein by reference in its entirety.

BACKGROUND

The present invention relates generally to computer memory, and more specifically, to policy-based, multi-scheme data reduction for a computer memory.

In order to store data efficiently in computer memory, data reduction techniques, such as compression and deduplication, are implemented in computer storage systems. Many different compression schemes and deduplication techniques are available. Data reduction may be applied within a storage device such that all data that is stored in the storage device is reduced using the same data reduction technique. However, it may be difficult to determine a particular data reduction technique to apply in a large file system or database that stores many different kinds of data, on different storage media or devices, for different purposes, applications, and users. Further, as data ages, its access pattern may change; thus the preferred data reduction technique for data may also change over time.

SUMMARY

Embodiments include a method, system, and computer program product for policy-based, multi-scheme data reduction for a computer memory. An aspect includes receiving a plurality of policy rules by a policy engine of the computer memory, wherein a first policy rule of the plurality of policy rules specifies applying a first data reduction scheme to data in the computer memory based on the data matching first characteristics, wherein a second policy rule of the plurality of policy rules specifies applying a second data reduction scheme to data in the computer memory based on the data matching second characteristics, wherein the first data reduction scheme is different from the second data reduction scheme. Another aspect includes determining, by the policy engine, that first data in the computer memory matches the first characteristics, and that second data in the computer memory matches the second characteristics. Yet another aspect includes applying the first data reduction scheme to the first data, and applying the second data reduction scheme to the second data.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of policy-based, multi-scheme data reduction for a computer memory are provided, with exemplary embodiments being discussed below in detail. Because the data types and access patterns may vary within a single file system or storage device, it is possible that no single data reduction technique may be optimally applied to all of the data. Therefore, a variety of data reduction techniques, or schemes, may be applied within the file system. Different data reduction schemes may be applied at the file level, or to different parts of a single file. The data reduction may be applied based on policy rules that are set by, for example, an administrator. Files in the computer memory are divided up into fragments that are stored in block groups of storage blocks, and different data reduction schemes may be applied at the fragment level. Reduced data may be read and written based on a block group header and storage block location records that specify the data reduction scheme that is applied to a storage block that is being read or written.

A file is stored in one or more storage blocks in the memory, and the storage blocks within each file are grouped into block groups. While a file may contain storage blocks in multiple block groups, each block group only belongs to a single file. A best-suited data reduction scheme may be selected for each file, or part of a file, in the computer memory, thereby increasing space savings. The data reduction scheme may be selected based on policy rules that specify a best data reduction scheme for particular data types or access patterns. A file size threshold may be set in some embodiments so that files that are smaller than the size threshold are not reduced. The policy rules may also specify when the data reduction is applied based on the load on the file system; for example, compression and deduplication may be performed during off-hours when the file system is at a relatively low load.

In some embodiments, each storage block in a block group is divided into fixed-size fragments, and a space-reducing technique (e.g., compression or deduplication) is applied to each of the fragments. In some embodiments, a block group is divided into variable-size fragments that may span across the storage blocks, and space-reduction techniques that depend on variable-size fragments (such as variable-size chunking for deduplication) are applied. Various fields and flags in the file metadata and the block group header may indicate the data reduction scheme used for particular data. A variety of reduction techniques may be applied in various embodiments, including but not limited to compression via zip, lz4, snappy, run-length encoding, or arbitrary user defined compression via a dynamically linked library. Data may also be deduplicated using an external catalog.

Figure 1:
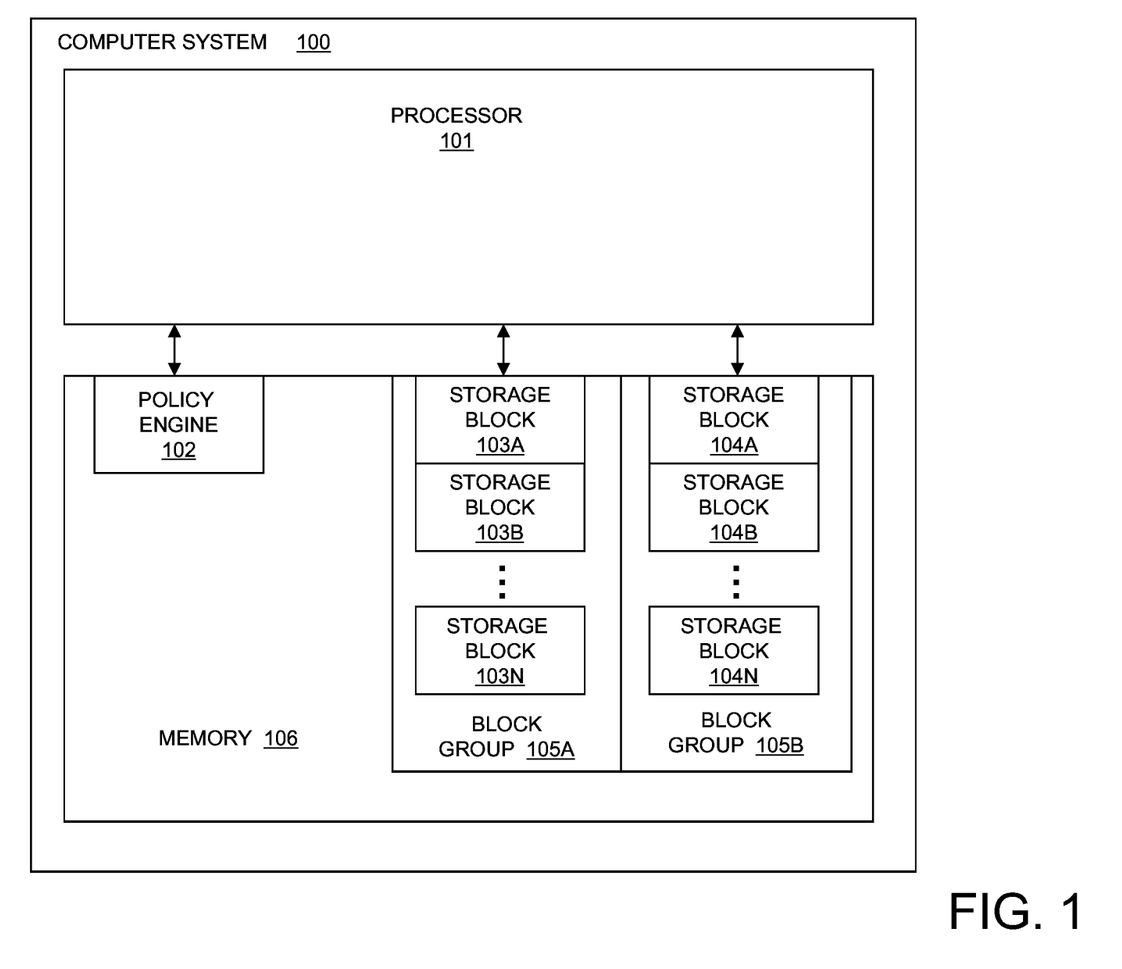
FIG. 1 depicts a computer system for policy-based, multi-scheme data reduction for a computer memory in accordance with an embodiment.

FIG. 1 depicts a computer system 100 for policy-based, multi-scheme data reduction for a computer memory in accordance with an embodiment. Computer system 100 comprises a file system including a processor 101 and a memory 106. Processor 101 stores data in memory 106 in storage blocks such as storage blocks 103A-N and storage blocks 104A-N, which are divided up into block groups 105A-B. A single file that is stored in memory 106 may span multiple storage blocks within a single block group, or multiple block groups. Policy engine 102 stores policy rules for application of data reduction techniques in memory 106. The policy rules in policy engine 102 may be set by, for example, an administrator. The policy engine 102 may determine, based on, for example, data type, file type, and/or access patterns, a type of data reduction to apply to any storage block in memory 106, such as storage blocks 103A-N or 104A-N. The policy engine may scan the memory 106 periodically in some embodiments in order to determine whether data reduction needs to be applied. In some embodiments, an access, such as reading or writing of data in one or more storage blocks may trigger determining by the policy engine 102 whether to apply a particular data reduction technique to the one or more storage blocks. The policy engine 102 may also specify when to apply data reduction; for example, data reduction may be performed during a period off-peak load period for the computer system 100 (for example, overnight), or after a specified amount of time has elapsed since a particular block group has been accessed. In some embodiments, the storage blocks 103A-N and 104A-N may each be 32 kilobytes (KB); however, storage blocks may be any appropriate size in various embodiments. In some embodiments, a fixed number of respective storage blocks (for example, 10) may form each block group. Computer system 100 is shown for illustrative purposes only, a memory such as memory 106 may comprise any appropriate number of storage blocks, and the storage blocks may be divided up into any appropriate number of block groups, each containing any appropriate number of storage blocks.

In some embodiments, a policy engine such as policy engine 102 may be implemented in a system comprising a general parallel file system (GPFS) scheme, such as is described with respect to U.S. Pat. No. 8,548,965 (Devarakonda et al., Oct. 1, 2013), which is hereby incorporated by reference in its entirety. The GPFS system provides a structured query language (SQL)-like language that is used to match the attributes of files in the system. For example, 'WHERE FILE_NAME LIKE'%.jpeg' determines all files with the ".jpeg" extension in the memory 106. The language of the GPFS system may be extended associate particular data reduction techniques with, for example, file extensions. The ACTION clause on the rules may be extended to include scheduling information to specify that the space reduction is performed in the future; for example, during a period of relatively low load in computer system 100. Some examples policy rules that may be implemented in various embodiments include functions to compute the best data reduction methods based on the data values stored in files and database tables, based on sampling of data in files or database tables, and/or based on storage media and device characteristics. Further policy rules may compare an amount of space that a possibly already compressed file currently occupies versus a predicted amount the file would occupy if the file is re-reduced with different data reduction methods. Such policy rules may be implemented in policy engine 102 in any appropriate manner. Operation of the policy engine is discussed in further detail below with respect to method 300 of FIG. 3.

Figure 2A:
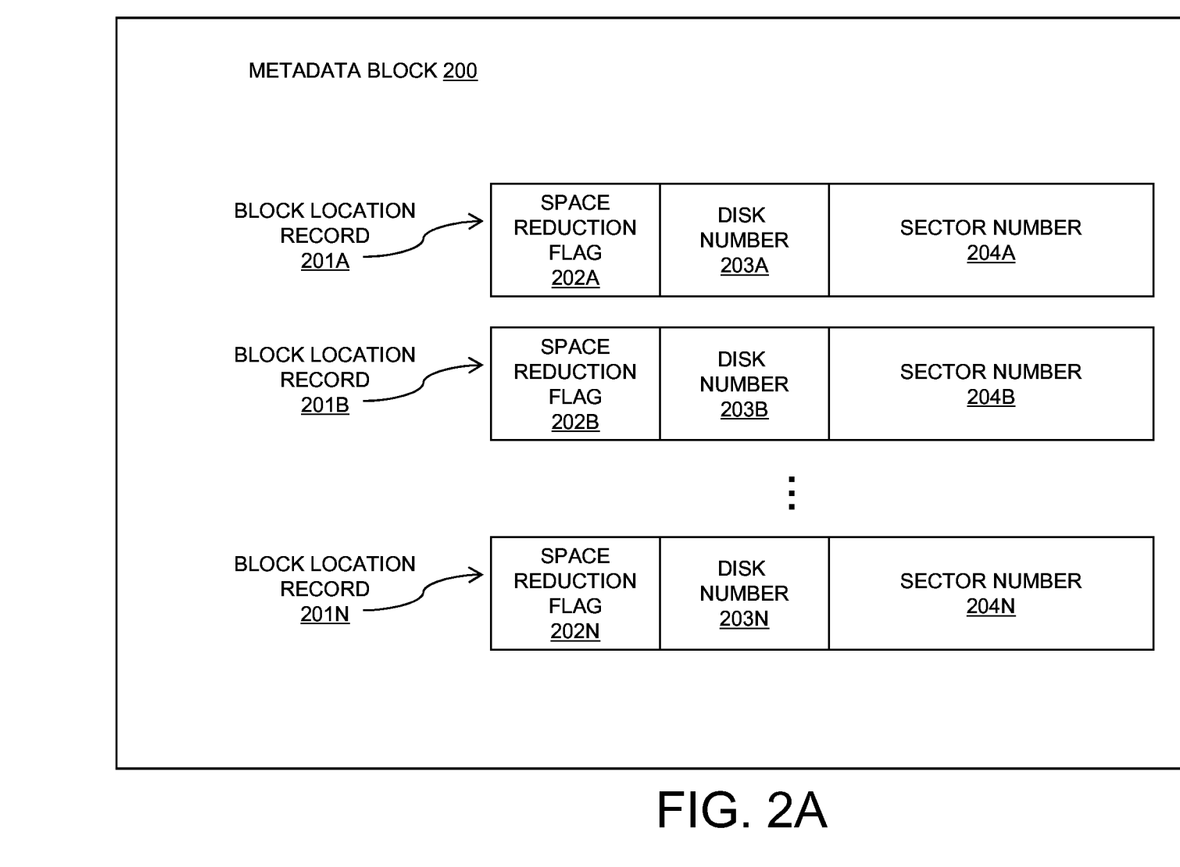
FIG. 2A depicts a metadata block including block location records for policy-based, multi-scheme data reduction for a computer memory in accordance with an embodiment.

In order to read a file, the file system must be able to locate the storage blocks that comprise that file. For this purpose, the file system maintains metadata blocks that record the location of each data block of each file. FIG. 2A illustrates an embodiment of a metadata block 200 for a file, which includes a plurality of block location records 201A-N that each points to a respective individual storage block (such as storage blocks 103A-N or 104A-N) that make up the file associated with metadata block 200. Each of storage block location records 201A-N includes a respective space reduction flag 202A-N, and a disk number 203A-N and sector number 204A-N, which gives the physical location in the memory of the storage block corresponding to the block location record. The space reduction flags 202A-N in each of the block location records 201A-N indicate whether the storage block corresponding to the block location record is unreduced (raw) or reduced (i.e., compressed or deduplicated). The space reduction flags 202A-N may indicate a type of reduction that is applied to the respective storage block associated with the block location record 201A-N in which the space reduction flag 202A-N is located.

Figure 2B:
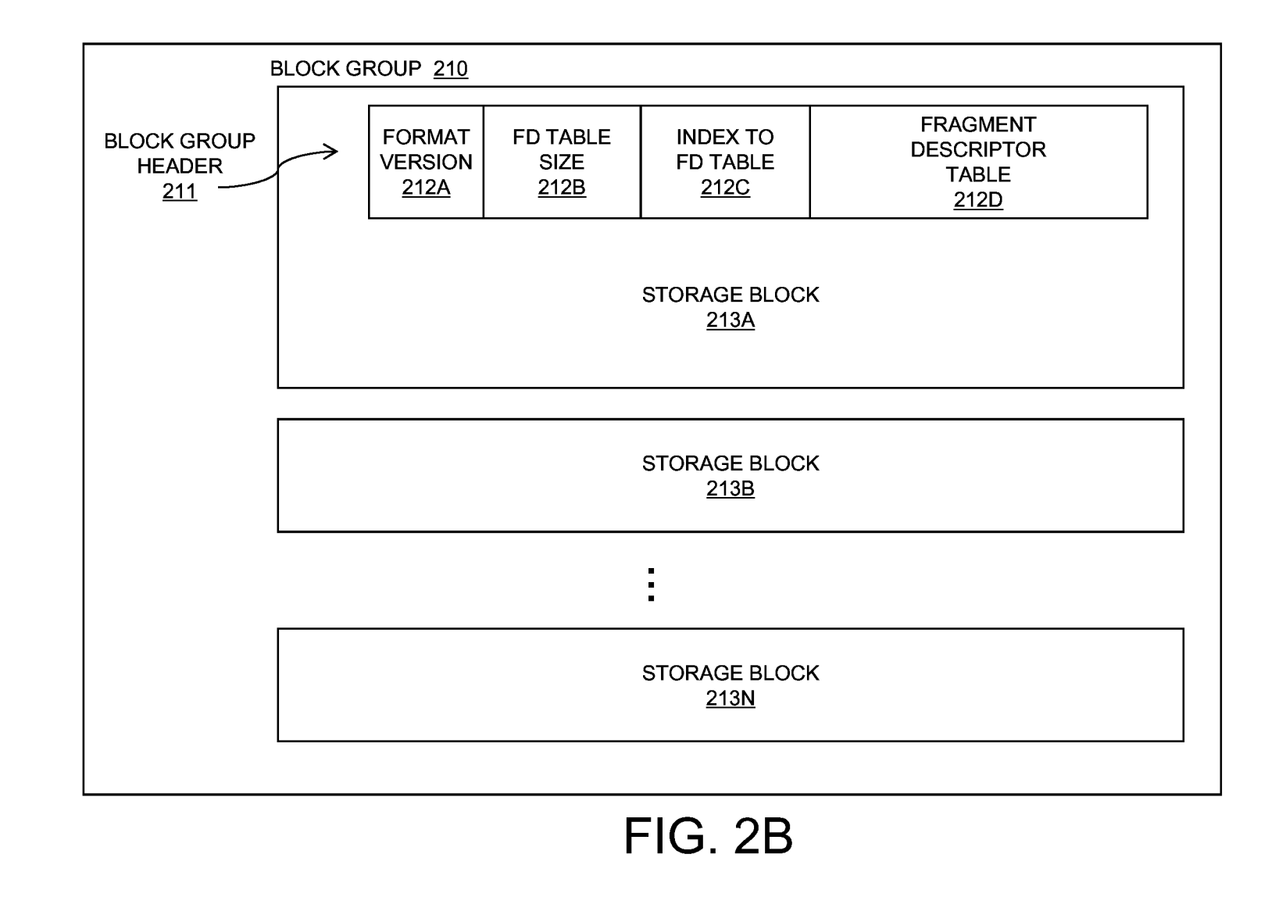
FIG. 2B depicts a block group header for policy-based, multi-scheme data reduction for a computer memory in accordance with an embodiment.

FIG. 2B depicts a block group 210 and a block group header 211 for policy-based, multi-scheme compression for a computer memory in accordance with an embodiment. Block group 210 may comprise either of block groups 105A-B shown in FIG. 1, and is made up of a plurality of storage blocks 213A-N, which may comprise storage blocks 103A-N or 104A-N that were shown in FIG. 1. Block group 210 includes a block group header 211, which describes the entire block group 210. The block group header 211 is located in the first storage block 213A of the block group 210. To enable relatively fast random access to reduced data, fixed size, hierarchical fragmenting of the data may be maintained. The block group header 211 includes a format version field 212A, fragment descriptor table size field 212B, and an index to the fragment descriptor table 212C. The fragment descriptor table 212D comprises a plurality of fragment descriptors that give information about the fragments that are stored in the storage blocks in the block group 210. The fragment descriptors in the fragment descriptor table 212D may include original fragment length, fragment type, a flag that indicates whether a fragment is in use, compression information such as fragment length with data reduction applied and starting offset, deduplication information such as signature and location information, and an index to the next fragment descriptor in the fragment descriptor table 212D. Each fragment descriptor covers a range of the original data, and defines how the original data were reduced and where the reduced data are stored. Each fragment descriptor may be the same size and correspond to a single storage block in the block group 210 in some embodiments, or in other embodiments, the fragments that are stored in the storage blocks may be variable in size. The block group header 211 may also include, for each storage block in the block group 210, the fragment offset within the block group 210, the compressed size and a flag indicating whether the fragment is compressed or raw. Also, the block group header 211 contains the number of storage blocks in the block group 210 and the size of the compressed group (including invalidated fragments and active fragments). Reduced data may be stored in the same storage block in which the data was located before it was reduced, in a different storage block within the same block group of the file, or may be stored elsewhere, such as a catalog or dictionary for duplicate data. All data within a fragment is reduced using the same method, but fragments may vary in size. A fragment may be relatively large, covering multiple storage blocks, or a fragment may be relatively small, covering less than a single storage block. A fragment comprises the smallest independent unit of compression in the memory. FIG. 2B is shown for illustrative purposes only; in various embodiments, the header information may be stored in any appropriate manner within a block group.

Figure 3:
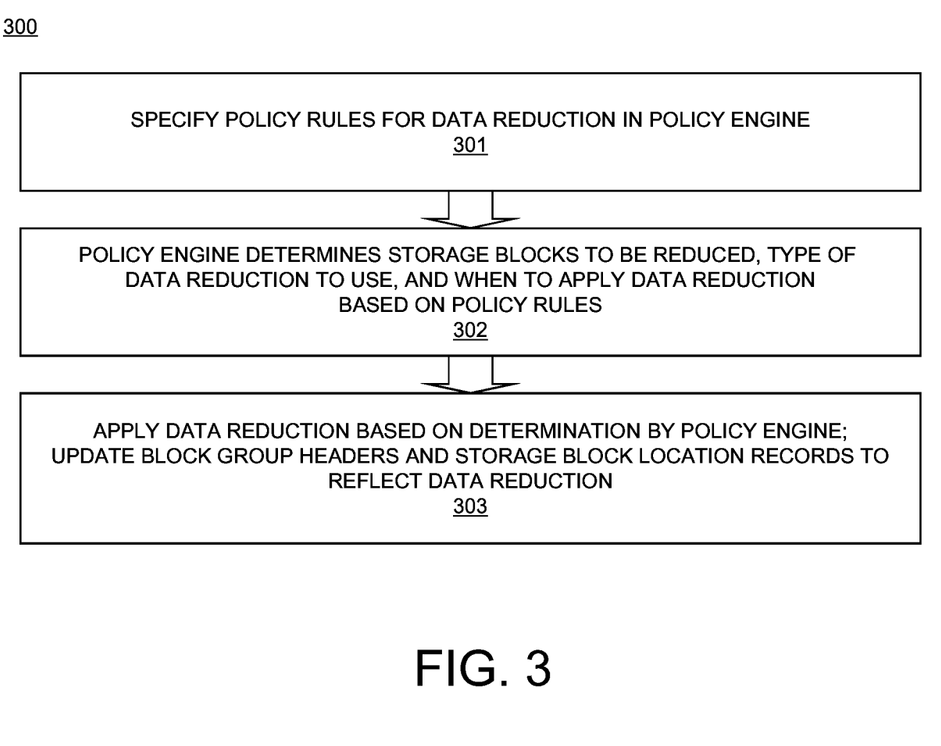
FIG. 3 depicts a process flow for application of policy-based, multi-scheme data reduction in accordance with an embodiment.

FIG. 3 depicts a method 300 for application of data reduction in conjunction with policy-based, multi-scheme data reduction in accordance with an embodiment. Method 300 may be implemented in policy engine 102. First, in block 301, a set of policy rules are defined in the policy engine 102. The rules may be set by, for example, an administrator. Any appropriate characteristics of data in the file system may be matched by the policy rules. The rules may be defined to match static attributes of each file in memory 106, such as file name, owner, or access time, may match static attributes of the underlying storage media. The rules may also match the contents of a file in some embodiments. Dynamic attributes may also be matched by the rules, such as recent access to the data, current load on the file system, or current time of day. Each policy rule specifies a data reduction technique. A rule that matches a file or part of a file defines the particular reduction technique that is applied to the data, or subset of the data, in that file. Reduction techniques that may be applied include but are not limited to a variety of compression algorithms, such as zip or lz4 for lossless compression; mpeg for lossy compression; and a variety of data deduplication algorithms that may be based on blocks, chunks, or streams in various embodiments. A rule may also specify a sampling heuristic to be used to determine if reduction should be attempted. A rule may also specify when the reduction should be applied. For example, reduction may be applied immediately in-line when the data is first written to a storage block. In other embodiments, data reduction may be applied after a threshold time period has elapsed since the file was last closed and no additional accesses to the file have occurred. The reduction may be scheduled for off-peak load hours in the file system, or any time the current load drops below some threshold, or may be scheduled as part of nightly backup. In further embodiments, the reduction technique applied to data may change as the data ages and is moved to slower physical storage or off-line.

Next, in block 302, the policy engine 102 determines the storage blocks to be reduced, the type of data reduction to use, and when to apply the data reduction, based on the policy rules that were defined in block 301. The policy engine may scan the memory 106 for files or data that match the rules at predefined intervals in some embodiments. In some embodiments, access to a file, such as a write or read, may trigger a determination by the policy engine 102 of whether the file matches a policy rule in the policy engine 102. Reduction may be applied to an entire file or to any portion of a file that matches a rule in policy engine 102. Lastly, in block 303, the file or portion of a file that was determined to match a rule in block 302 is reduced according to the matched rule. For example, the type of data reduction and the time of application of the data reduction are applied to the matching data according to the rule. In conjunction with application of data reduction, any block group headers and storage block location records (as shown in FIG. 2A-B) associated with the reduced data are updated to reflect the data reduction. Blocks 302 and 303 may be repeated as needed by the policy engine 102 during operation of the computer system 100 in order to apply data reduction to the data in memory 106.

Figure 4:
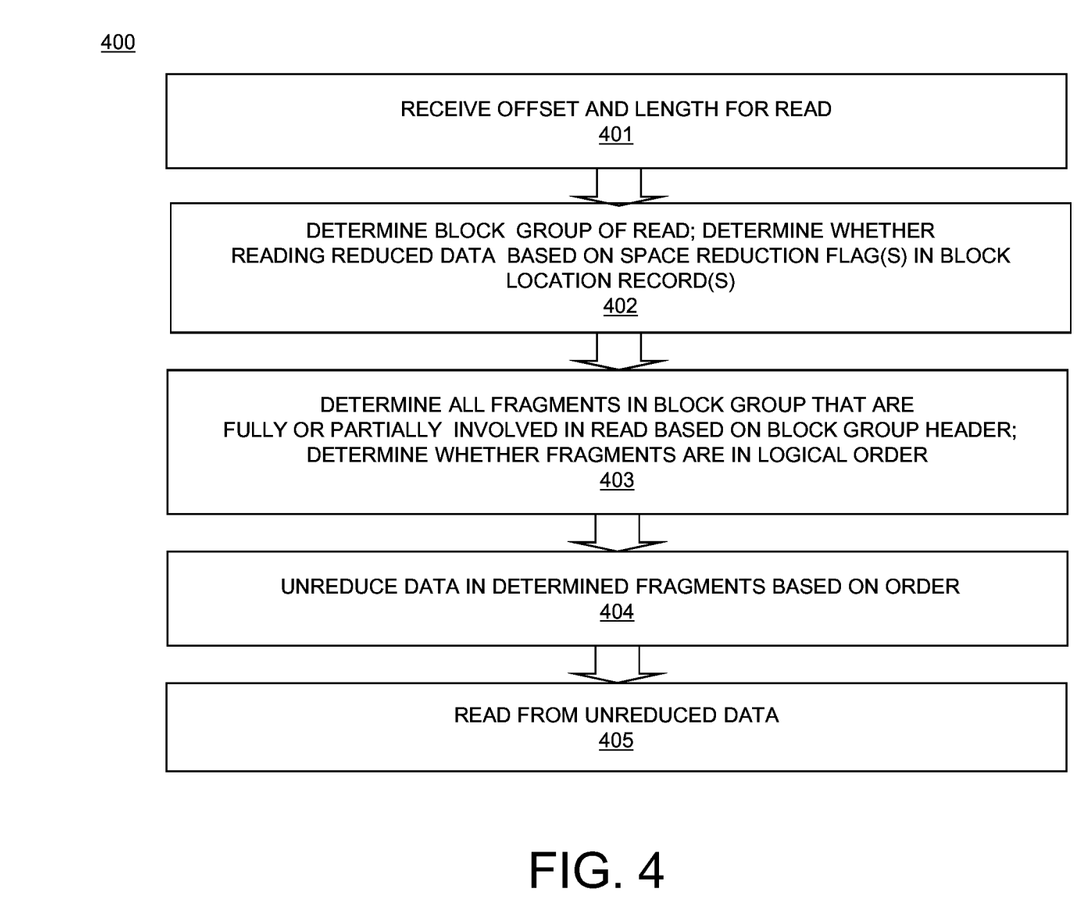
FIG. 4 depicts a process flow for performing a read of reduced data in conjunction with policy-based, multi-scheme data reduction in accordance with an embodiment.

FIG. 4 depicts a method 400 for performing a read of reduced data in conjunction with policy-based, multi-scheme data reduction in accordance with an embodiment. First, in block 401, an offset and length for a read command are received. Next, in block 402, the block group of the read is determined based on the metadata block 200 for the file that is being read. The file system may first obtain a byte-range lock over the requested region in order to insure consistency of the data before determining the block group. It is also determined, based on the space reduction flag(s) (such as space reduction flags 202A-N) in the block location records that point to the storage blocks of the read whether the read is reading reduced data. If it is determined that the read is not reading reduced data, the read proceeds as normal and the unreduced data is read directly. However, if it is determined that the read is reading reduced data, the file system extends its byte range lock to cover the entire block group containing the requested data, and flow proceeds to block 403. In block 403, the particular reduced storage blocks involved in the read are determined. A read may spans multiple storage blocks or portions of storage blocks; all storage blocks that are to be fully or partially read by the read are determined in block 403. This determination is made based on the block group header. Then, in block 404, the determined storage blocks are unreduced, e.g., uncompressed in memory. Lastly, in block 405, the read is performed from the unreduced data.

If many fragments of storage blocks need to be uncompressed in block 404 of method 400, it is faster to uncompress them together, rather than one at a time; however, in order to uncompress the fragments together, the fragments need to be physically adjacent in the memory. Fragments are logically adjacent just after initially compression of a file, but after writes to the compressed file (discussed below with respect to FIG. 5), the order of the fragments in memory may change, and logically adjacent fragments may not be physically adjacent. Inspecting the fragment location data in fragment descriptor table 212D of the block group header 211 may therefore be performed in block 403, so that the contiguous sequences of compressed fragments may be determined and used for uncompressing the contiguous fragments together.

Figure 5:
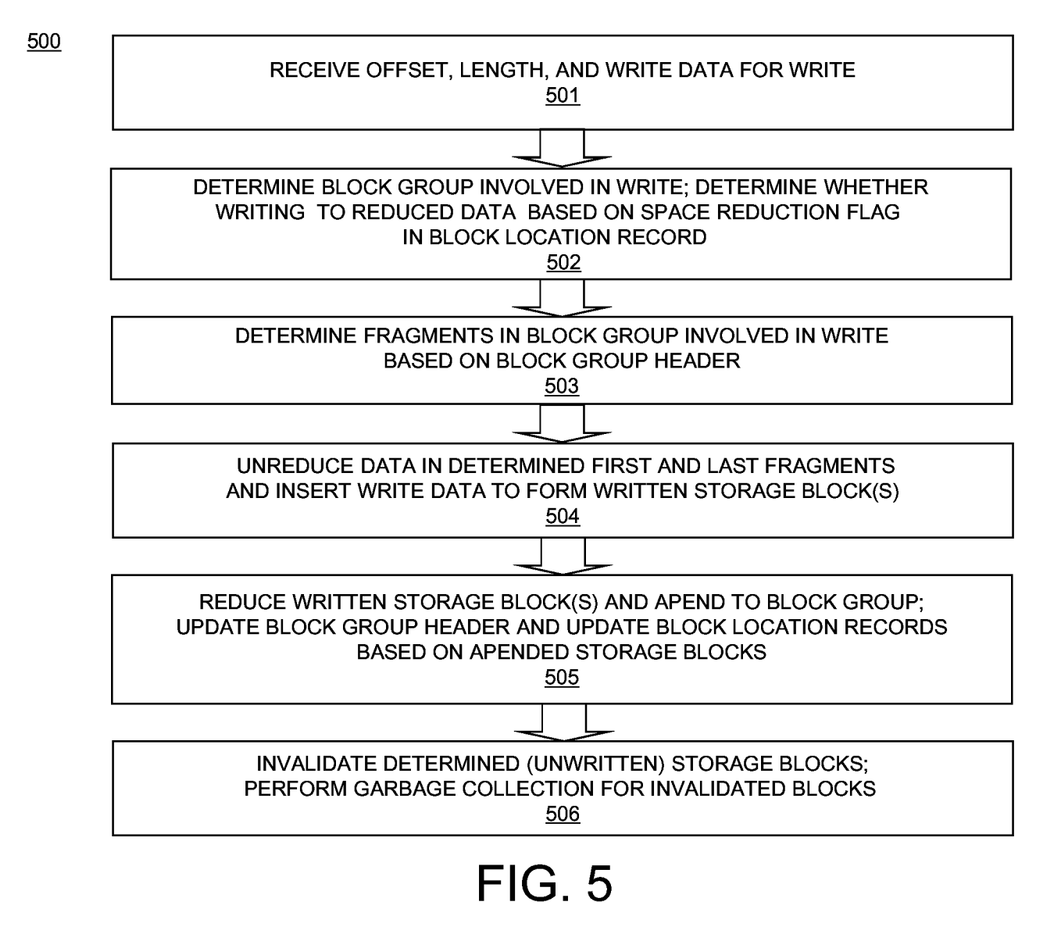
FIG. 5 depicts a process flow for performing a write to reduced data in conjunction with policy-based, multi-scheme data reduction in accordance with an embodiment.

FIG. 5 depicts a method 500 for performing a write to reduced data in conjunction with policy-based, multi-scheme data reduction in accordance with an embodiment. First, in block 501, an offset, length, and write data for a write are received. Then, in block 501, the block group for the write is determined based on the metadata block 200 for the file that is being written, and it is determined whether the write is to reduced data based on the space reduction flag(s) (such as space reduction flags 202A-N) in the block location records that point to the storage blocks of the write. If the write is to unreduced data, the write is performed directly on the unreduced data. If the write is to reduced data, flow proceeds to block 503. In block 503, the first and last fragments in the block group that are involved in the write are determined using the fragment descriptor table 212D in the block group header 211. Next, in block 504, if the write does not align to the fragment boundaries, the first and last fragments are unreduced, and the write data is inserted in between the unreduced first and last fragments, resulting in unreduced write storage block data for the write. If the write does align to the storage block boundaries, the first and/or last fragments may not need to be unreduced but are rather overwritten entirely. The contents of any intermediate fragments (which may comprise entire storage blocks) do not need to be unreduced, because the data in the intermediate fragments is being completely overwritten with the write data. Then, in block 505, the unreduced storage block data is reduced and appended in new storage blocks to the end of the block group. The block group header is updated to indicate the new location of the written data after the write, and the block location records in the metadata block 200 for the written file are also updated as needed.

Lastly, in block 506, the original fragments that were determined in block 503 (first, last, and any intermediate fragments) are invalidated. These invalidated fragments may be garbage collected by the file system when, for example, their cumulative size starts significantly lowering (i.e., based on a threshold) the compression ratio for the block group. No uncompression is needed to perform garbage collection. The first storage block in the block group that contains at least one invalidated fragment is read and copied to the output buffer for the block group; any initial blocks that are not invalidated do not need to be read in block 506. The fragments of the block group are then shifted over the invalidated fragments, so that the fragments of the block group are physically adjacent. In some embodiments of garbage collection, the valid storage fragments may be rearranged so that the compressed fragments are in the same order as the raw fragments (i.e., in logical order). In other embodiments, the valid fragments are copied one after the other to the shifted location in whatever order they happen to be.

As described above with respect to FIG. 5, in some embodiments, when a reduced file is modified (i.e., partially written over), the storage blocks that were written over are invalidated but left in place, and their block group header entries are modified to point to the new storage blocks that are appended at the end of the block group. Therefore, after writing to a reduced file, the order of reduced fragments in the block group does not always follow the order of raw data in the file. In order to write to storage blocks that have fragments that do not follow the order of raw data in the file, preprocessing of the data in the block group header may be performed in block 503 to determine the locations of the fragments involved in the write. The preprocessing may comprise storing the identifiers of the fragments involved in the write in a temporary array based on the data in the block group header, and sorting the temporary array based on the logical order of the data in the storage blocks in the file. It is then determined based on the block group header and the temporary array which blocks are both physically and logically adjacent to one another. Blocks that are determined to be both physically and logically adjacent to one another are unreduced as a group, while blocks that are out of order are unreduced separately.

Figure 6:
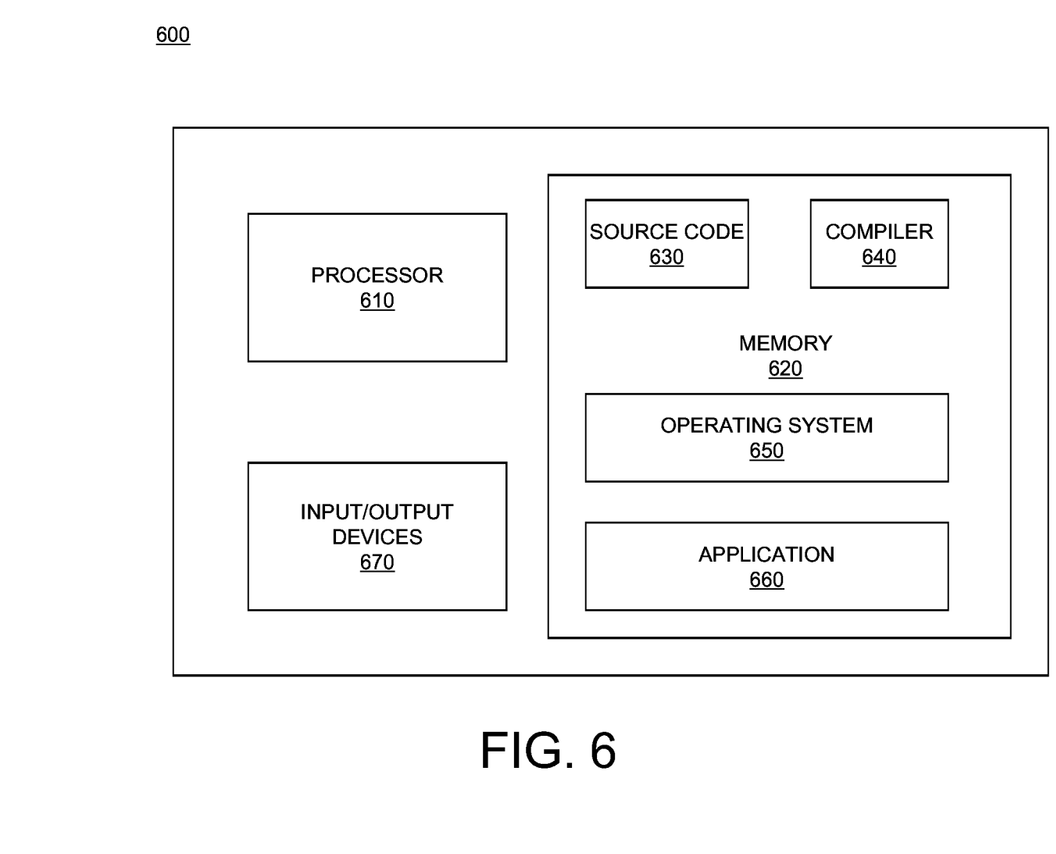
FIG. 6 depicts an example of a computer that may be used in conjunction with policy-based, multi-scheme data reduction for a computer memory.

FIG. 6 illustrates an example of a computer 600 which may be utilized in conjunction with exemplary embodiments of policy-based, multi-scheme compression for a computer memory. Various operations discussed above may utilize the capabilities of the computer 600. One or more of the capabilities of the computer 600 may be incorporated in any element, module, application, and/or component discussed herein. For example, processor 101 may comprise processor 610, and memory 106 may comprise memory 620.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include . . . <add the technical benefits as described above>

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for policy-based, multi-scheme data reduction in a computer memory, the method comprising:
   receiving, by a policy engine of the computer memory, a plurality of policy rules comprising a first policy rule that specifies applying a first data reduction scheme to data in the computer memory that matches first characteristics and a second policy rule that specifies applying a second data reduction scheme to data in the computer memory that matches second characteristics, wherein the first data reduction scheme is different from the second data reduction scheme;
   determining, by the policy engine, that first data in the computer memory matches the first characteristics;
   determining, by the policy engine, that second data in the computer memory matches the second characteristics;
   applying the first data reduction scheme to the first data;
   modifying a metadata block corresponding to the first data and the second data to indicate that the first data reduction scheme was applied to the first data;
   applying the second data reduction scheme to the second data; and
   modifying the metadata block to indicate that the second data reduction scheme was applied to the second data.

2. The computer-implemented method of claim 1, wherein the first data reduction scheme and the second data reduction scheme each comprise a respective one of zip, lz4, snappy, run-length encoding, user defined compression via a dynamically linked library, and deduplication via an external catalog; and
   wherein the first characteristics and second characteristics each comprise one or more of: a file type, a type of data, a file name, a file owner, a last access time, and file contents.

3. The computer-implemented method of claim 1, wherein the plurality of policy rules further comprises a third policy rule that specifies applying a third data reduction scheme to data in the computer memory that matches third characteristics, the method further comprising:
   determining that a first portion of data in a file in the computer memory matches the third characteristics;
   applying the third data reduction scheme to the first portion of the data in the file; and
   maintaining a second portion of the data in the file in unreduced form.

4. The computer-implemented method of claim 1, wherein the first policy rule further specifies a time for applying the first data reduction scheme to the data in the computer memory that matches the first characteristics, and wherein the time comprises one of an off-peak load period for the computer memory or a time that occurs after a predetermined time period has elapsed since a last access to the data in the computer memory that matches the first characteristics.

5. The method of claim 1, further comprising storing the metadata block, the metadata block comprising a plurality of block location records, each of the plurality of block location records comprising:
 a respective space reduction flag indicative of the first data reduction scheme or the second data reduction scheme; and
 a physical location of a respective data block that holds a respective portion of the first data reduced by applying the first data reduction scheme or a respective portion of the second data reduced by applying the second data reduction scheme, wherein the plurality of respective data blocks comprise a block group,
 the method further comprising:
  storing a block group header in a first storage block of the block group, wherein the block group header comprises a fragment descriptor table that indicates a location of each of a plurality of fragments of the first data and the second data in the block group.

6. The method of claim 1, further comprising performing a read of read data in the computer memory, wherein performing the read comprises:
 determining a block group that is involved in the read;
 determining, based at least in part on a space reduction flag located in a block location record corresponding to the block group, that the read data is reduced data;
 determining one or more fragments of the block group that are involved in the read based at least in part on a block group header of the determined block group;
 determining that the one or more fragments are in logical order; and
 unreducing the one or more fragments and reading the read data from the unreduced one or more fragments based at least in part on determining that the one or more fragments are reduced and in logical order.

7. The method of claim 1, further comprising performing a write of write data in the computer memory, wherein performing the write comprises:
 determining a block group that is involved in the write;
 determining, based at least in part on a space reduction flag located in a block location record corresponding to the block group, that the write data is reduced data;
 determining a set of fragments of the block group that are involved in the write based at least in part on a block group header of the determined block group;
 determining a first fragment and a last fragment of the set of fragments based at least in part on determining that the write data is reduced data;
 unreducing the first fragment and the last fragment, wherein at least one intermediate fragment of the set of fragments is not unreduced; and
 inserting the write data in between the unreduced first fragment and the unreduced last fragment;
 reducing the unreduced first fragment and the unreduced second fragment with the inserted write data to form written storage blocks; and
 appending the written storage blocks to the block group.

8. The method of claim 7, further comprising:
 updating the block location record in the metadata block based on the appended written storage blocks; and
 invalidating and garbage collecting the determined set of fragments.

9. A computer program product for implementing policy-based, multi-scheme data reduction in a computer memory, the computer program product comprising:
 a computer readable storage medium having program instructions embodied therewith, the program instructions readable by a processing circuit to cause the processing circuit to perform a method comprising:
  receiving, by a policy engine of the computer memory, a plurality of policy rules comprising a first policy rule that specifies applying a first data reduction scheme to data in the computer memory that matches first characteristics and a second policy rule that specifies applying a second data reduction scheme to data in the computer memory that matches second characteristics, wherein the first data reduction scheme is different from the second data reduction scheme;
  determining, by the policy engine, that first data in the computer memory matches the first characteristics;
  determining, by the policy engine, that second data in the computer memory matches the second characteristics;
  applying the first data reduction scheme to the first data;
  modifying a metadata block corresponding to the first data and the second data to indicate that the first data reduction scheme was applied to the first data;
  applying the second data reduction scheme to the second data; and
  modifying the metadata block to indicate that the second data reduction scheme was applied to the second data.

10. The computer program product of claim 9, wherein the first data reduction scheme and the second data reduction scheme each comprise a respective one of zip, lz4, snappy, run-length encoding, user defined compression via a dynamically linked library, and deduplication via an external catalog; and
 wherein the first characteristics and second characteristics each comprise one or more of: a file type, a type of data, a file name, a file owner, a last access time, and file contents.

11. The computer program product of claim 9, wherein the plurality of policy rules further comprises a third policy rule that specifies applying a third data reduction scheme to data in the computer memory that matches third characteristics, the method further comprising:
 determining that a first portion of data in a file in the computer memory matches the third characteristics;
 applying the third data reduction scheme to the first portion of the data in the file; and
 maintaining a second portion of the data in the file in unreduced form.

12. The computer program product of claim 9, wherein the first policy rule further specifies a time for applying the first data reduction scheme to the data in the computer memory that matches the first characteristics, and wherein the time comprises one of an off-peak load period for the computer memory or a time that occurs after a predetermined time period has elapsed since a last access to the data in the computer memory that matches the first characteristics.

13. The computer program product of claim 9, the method further comprising storing the metadata block, the metadata block comprising a plurality of block location records, each of the plurality of block location records comprising:
- a respective space reduction flag indicative of the first data reduction scheme or the second data reduction scheme; and
- a physical location of a respective data block that holds a respective portion of the first data reduced by applying the first data reduction scheme or a respective portion of the second data reduced by applying the second data reduction scheme, wherein the plurality of respective data blocks comprise a block group,
the method further comprising:
- storing a block group header in a first storage block of the block group, wherein the block group header comprises a fragment descriptor table that indicates a location of each of a plurality of fragments of the first data and the second data in the block group.

14. The computer program product of claim 9, the method further comprising performing a read of read data in the computer memory, wherein performing the read comprises:
- determining a block group that is involved in the read;
- determining, based at least in part on a space reduction flag located in a block location record corresponding to the block group, that the read data is reduced data;
- determining one or more fragments of the block group that are involved in the read based at least in part on a block group header of the determined block group;
- determining that the one or more fragments are in logical order; and
- unreducing the one or more fragments and reading the read data from the unreduced one or more fragments based at least in part on determining that the one or more fragments are reduced and in logical order.

15. The computer program product of claim 9, the method further comprising performing a write of write data in the computer memory, wherein performing the write comprises:
- determining a block group that is involved in the write;
- determining, based at least in part on a space reduction flag located in a block location record corresponding to the block group, that the write data is reduced data;
- determining a set of fragments of the block group that are involved in the write based at least in part on a block group header of the determined block group;
- determining a first fragment and a last fragment of the set of fragments based at least in part on determining that the write data is reduced data;
- unreducing the first fragment and the last fragment, wherein at least one intermediate fragment of the set of fragments is not unreduced; and
- inserting the write data in between the unreduced first fragment and the unreduced last fragment;
- reducing the unreduced first fragment and the unreduced second fragment with the inserted write data to form written storage blocks; and
- appending the written storage blocks to the block group.

16. A computer system configured to implement policy-based, multi-scheme data reduction, the system comprising:
- a computer memory storing computer-executable instructions; and
- a processor communicatively coupled to the computer memory and configured to access the computer memory and execute the computer-executable instructions to:
  - receive, by a policy engine of the computer memory, a plurality of policy rules comprising a first policy rule that specifies applying a first data reduction scheme to data in the computer memory that matches first characteristics and a second policy rule that specifies applying a second data reduction scheme to data in the computer memory that matches second characteristics, wherein the first data reduction scheme is different from the second data reduction scheme;
  - determine, by the policy engine, that first data in the computer memory matches the first characteristics;
  - determine, by the policy engine, that second data in the computer memory matches the second characteristics;
  - apply the first data reduction scheme to the first data;
  - modifying a metadata block corresponding to the first data and the second data to indicate that the first data reduction scheme was applied to the first data;
  - apply the second data reduction scheme to the second data; and
  - modifying the metadata block to indicate that the second data reduction scheme was applied to the second data.

17. The system of claim 16, wherein the plurality of policy rules further comprises a third policy rule that specifies applying a third data reduction scheme to data in the computer memory that matches third characteristics, and wherein the processor is further configured to execute the computer-executable instructions to:
- determine that a first portion of data in a file in the computer memory matches the third characteristics;
- apply the third data reduction scheme to the first portion of the data in the file; and
- maintain a second portion of the data in the file in unreduced form.

18. The system of claim 16, wherein the processor is further configured to execute the computer-executable instructions to store the metadata block, the metadata block comprising a plurality of block location records, each of the plurality of block location records comprising:
- a respective space reduction flag indicative of the first data reduction scheme or the second data reduction scheme; and
- a physical location of a respective data block that holds a respective portion of the first data reduced by applying the first data reduction scheme or a respective portion of the second data reduced by applying the second data reduction scheme, wherein the plurality of respective data blocks comprise a block group, and wherein the processor is further configured to execute the computer-executable instructions to:
  - store a block group header in a first storage block of the block group, wherein the block group header comprises a fragment descriptor table that indicates a location of each of a plurality of fragments of the first data and the second data in the block group.

19. The system of claim 16, wherein the processor is further configured to execute the computer-executable instructions to perform a read of read data in the computer memory, wherein performing the read comprises:
- determining a block group that is involved in the read;
- determining, based at least in part on a space reduction flag located in a block location record corresponding to the block group, that the read data is reduced data;
- determining one or more fragments of the block group that are involved in the read based at least in part on a block group header of the determined block group;

determining that the one or more fragments are in logical order; and unreducing the one or more fragments and reading the read data from the unreduced one or more fragments based at least in part on determining that the one or more fragments are reduced and in logical order.

20. The system of claim 16, wherein the processor is further configured to perform a write of write data in the computer memory, wherein performing the write comprises:

determining a block group that is involved in the write;

determining, based at least in part on a space reduction flag located in a block location record corresponding to the block group, that the write data is reduced data;

determining a set of fragments of the block group that are involved in the write based at least in part on a block group header of the determined block group;

determining a first fragment and a last fragment of the set of fragments based at least in part on determining that the write data is reduced data;

unreducing the first fragment and the last fragment, wherein at least one intermediate fragment of the set of fragments is not unreduced; and inserting the write data in between the unreduced first fragment and the unreduced last fragment;

reducing the unreduced first fragment and the unreduced second fragment with the inserted write data to form written storage blocks; and appending the written storage blocks to the block group.

\* \* \* \* \*